US008527995B2

(12) United States Patent
Onianwa et al.

(10) Patent No.: US 8,527,995 B2
(45) Date of Patent: Sep. 3, 2013

(54) SYNCHRONIZATION SYSTEM FOR ENTITIES MAINTAINED BY MULTIPLE APPLICATIONS

(75) Inventors: Chukwunwike I. J. Onianwa, Sammamish, WA (US); Bishara Kharoufeh, Sammamish, WA (US); Tao Zhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1170 days.

(21) Appl. No.: 12/038,189

(22) Filed: Feb. 27, 2008

(65) Prior Publication Data

US 2009/0217289 A1 Aug. 27, 2009

(51) Int. Cl.
*G06F 9/46* (2006.01)
(52) U.S. Cl.
USPC .......................................... 718/101; 707/610
(58) Field of Classification Search
USPC .............................. 707/10, 204, 610; 718/101
See application file for complete search history.

(56) References Cited

U.S. PATENT DOCUMENTS

| 6,389,423 | B1* | 5/2002 | Sakakura ...................... 707/613 |
| 6,915,312 | B2* | 7/2005 | Bodnar et al. ................ 707/624 |
| 7,290,056 | B1* | 10/2007 | McLaughlin, Jr. ........... 709/230 |
| 7,707,175 | B1* | 4/2010 | Pivowar et al. .............. 707/610 |
| 7,747,561 | B1* | 6/2010 | Gupta et al. ....................... 1/1 |
| 7,809,682 | B2* | 10/2010 | Paterson et al. .............. 707/625 |
| 7,930,269 | B2* | 4/2011 | Hindle et al. ................. 707/610 |
| 8,086,827 | B2* | 12/2011 | Welc et al. ................... 712/225 |
| 2010/0205324 | A1* | 8/2010 | Prasad .......................... 709/248 |

* cited by examiner

*Primary Examiner* — Diem Cao
(74) *Attorney, Agent, or Firm* — Perkins Coie LLP

(57) ABSTRACT

A synchronization system provides a generic synchronization mechanism in which copies of data of an entity maintained by different applications can be synchronized through application-specific entity adapters. An entity adapter for an application receives from the synchronization system a synchronization request to synchronize an entity of the application and interacts with the application to ensure the entity is synchronized as requested. Each application that takes an action on an entity provides a transaction to the synchronization system. Upon receiving a transaction, the synchronization system stores an indication of the transaction in a synchronization store. The synchronization system waits until any sent synchronization transactions for an entity complete before sending subsequent synchronization transactions for that entity to ensure that the same transaction ordering is used by the target applications.

20 Claims, 11 Drawing Sheets

SYNCHRONIZATION SYSTEM FOR ENTITIES MAINTAINED BY MULTIPLE APPLICATIONS

BACKGROUND

Many business applications have been developed to meet the various needs of organizations, such as companies, non-profit organizations, and governmental agencies. These business applications may include customer relationship management ("CRM") applications, inventory management applications, human resource applications, accounting applications, payroll applications, project management applications, and so on. Since a single business application is unlikely to meet all the information processing needs of an organization, organizations typically use several different business applications to meet their needs.

Each business application needs to access data of the organization to perform its processing. Data of an organization is typically stored on a per-entity basis. An entity may be a person, a group of people (e.g., a marketing group), a company, a piece of equipment, an order, and so on. Each business application may maintain its own copy of the data for an entity and may actually maintain data for an entity that is different from data maintained by other business applications for that entity. For example, a human resources application may maintain detailed data about each employee of the organization including employee identification number, social security number, age, home address, tax information (e.g., marital status), technical skills (e.g., welder), grade level (e.g., apprentice), and so on. A project management application, in contrast, may need to store for each employee only a subset of that data that includes employee identification number, technical skills, and grade level. Each entity typically has a unique identifier (e.g., employee number or customer number) that never changes. In this way, the entity can be uniquely identified even though its name or other attributes change.

It might be desirable for an organization to store its data for all its entities in a central database that is accessed by each business application as needed. Unfortunately, the use of such a central database is impractical for several reasons. First, most existing business applications have been developed to maintain their own copy of the data that they need. Even if all the different developers were to agree upon a standard for accessing data of a central database, it would be very time-consuming and costly to modify each business application to access a central database. Second, some business applications may have certain time constraints for accessing data that cannot be satisfied when a central database is used. For example, a banking application may need to access and update account information within a fraction of a second of receiving deposit requests, withdrawal requests, balance requests, and so on from automated teller machines ("ATMs"). The overhead of a central database may not allow for such timely access.

Since many business applications maintain their own copy of data of an entity, there is a possibility that an update to one copy of the data of an entity will not be promulgated to other copies of that data. Thus, the different copies of the data will not be synchronized, and it will be difficult to determine what actually is the correct data for an entity. To keep its data synchronized, an organization may develop ad hoc programs for each pair of business applications that check for and replicate updates to data. The developing of such ad hoc programs for each pair of business application is expensive, time-consuming, and error-prone.

SUMMARY

A synchronization system provides a generic synchronization mechanism in which copies of data of an entity maintained by different applications can be synchronized through application-specific entity adapters. Each application that takes an action on an entity provides a transaction to the synchronization system. Upon receiving a transaction, the synchronization system stores an indication of the transaction in a synchronization store. The synchronization system waits until any sent synchronization transaction for an entity completes before sending subsequent transactions for that entity to ensure that the same transaction ordering is used by the target applications. The synchronization system sends the transactions for an application to the application's entity adapter. The entity adapters provide a common interface to the synchronization system for accessing data of the entities of each application. Upon receiving a transaction, an entity adapter for an application interacts with the application to ensure the entity is synchronized as requested. The synchronization store that contains information needed by the synchronization system to ensure that the entities of the application are updated in a way that ensures synchronization. Because the synchronization system sends transactions to the applications via their entity adapters, the data of any two applications can be synchronized once the entity adapters are developed for those applications. The use of the synchronization system and application-specific entity adapters avoids the need for development of ad hoc programs for each pair of applications whose data is to be synchronized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
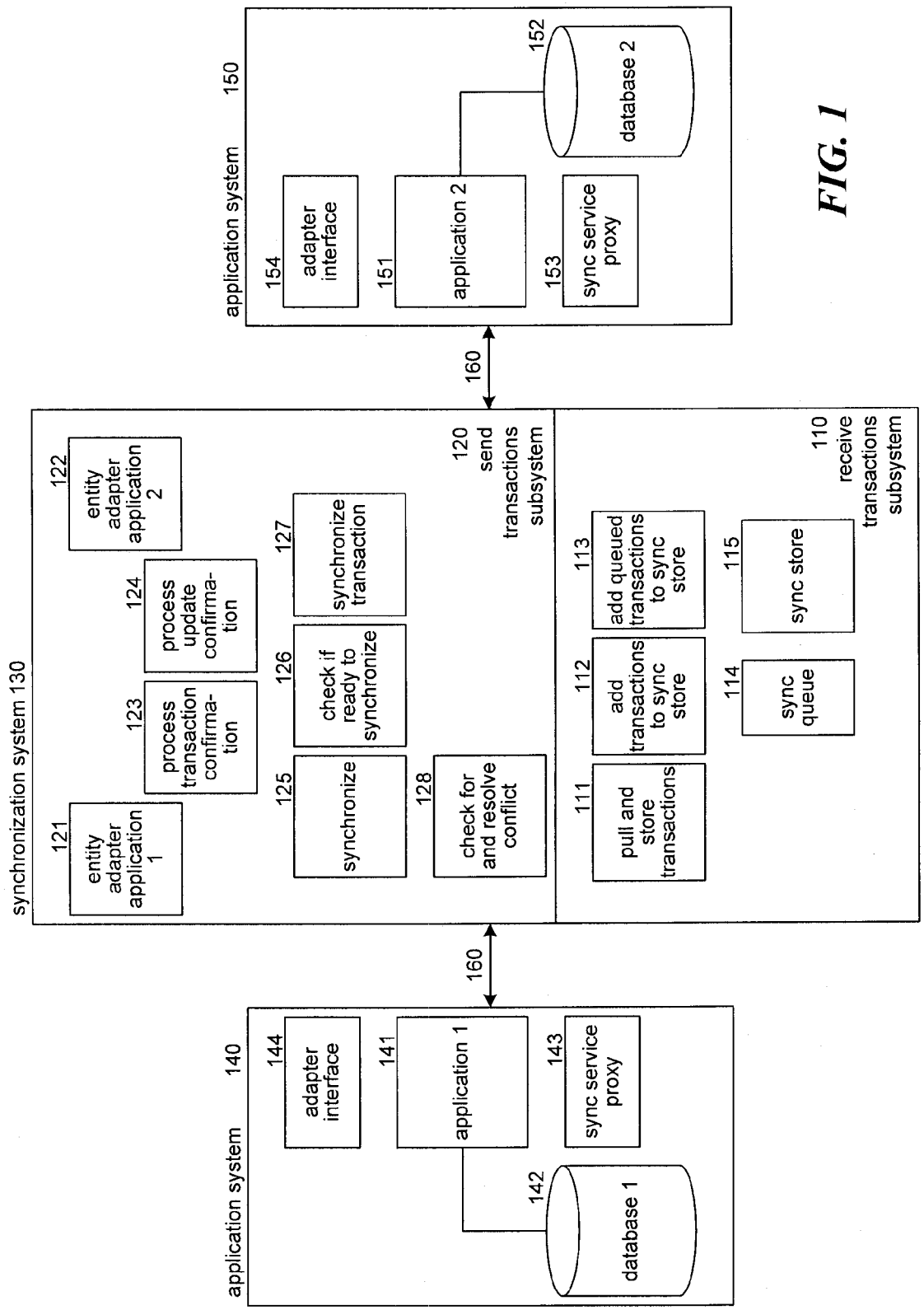
FIG. 1 is a block diagram that illustrates the overall architecture of the synchronization system in some embodiments.

A method and system for synchronizing entities of multiple applications is provided. In some embodiments, a synchronization system provides a generic synchronization mechanism in which copies of data of an entity maintained by different applications can be synchronized through application-specific entity adapters. Each entity adapter provides a common interface to the synchronization system for accessing data of the entities of an application. An entity adapter for an application receives from the synchronization system a transaction that was originated by another application. Upon receiving the transaction, the entity adapter interacts with the application to ensure the entity is synchronized. The synchronization system provides a synchronization store that contains information needed by the synchronization system to ensure that the entities of the application are updated in a way that ensures synchronization. For example, the synchronization store may include for each entity a list of transactions originated by various applications that have not yet been sent to the other applications for synchronization. Each application that takes an action on an entity (referred to as a "source application") provides a transaction to the synchronization system. The transaction identifies the entity, the version of the entity, and the action (e.g., update or delete) that applies to the entity. Upon receiving a transaction, the synchronization system stores an indication of the transaction in the synchronization store. To keep the copies of the data of the entity synchronized, the synchronization system sends the transactions to the other applications (referred to as "target applications"). The synchronization system orders the transactions to ensure that the data for an entity is updated in the same order as updated by the source applications. In addition, the synchronization system waits until any sent transaction for an entity completes before sending subsequent synchronization transactions for that entity to ensure that the same transaction ordering is used by the target applications. Because the synchronization system sends transactions to the applications via their entity adapters, the data of any two applications can be synchronized once the entity adapters are developed for those applications. The use of the synchronization system and application-specific entity adapters avoids the need for development of ad hoc programs for each pair of applications whose data is to be synchronized.

In some embodiments, the synchronization system checks for and resolves conflicts resulting from applications that modify data of an entity inconsistently. Conflicts can arise in various ways. For example, a first user may use a first application to access the old billing address for a customer, to update it to a first new address, and to send a first transaction. At the same time, a second user may use a second application to access the old billing address for that same customer, to update it to a second new address, and to send a second transaction. Each user may have different customer contacts who indicate that different billing addresses should be used. When the synchronization system receives the first transaction, it sends the first transaction to the other applications. When the synchronization system receives the second transaction, it could simply send the second transaction, which would effectively overwrite the data of the first transaction. Each user, of course, only intended to modify the old billing address and not some other new billing address. Indeed, when the source application that sent the first transaction receives the second transaction, it would change its billing address from the first to the second billing address. Similarly, when the source application that sent the second transaction receives the first transaction, it would change its billing address from the second to the first billing address. Thus, the first user would see the first billing address unexpectedly changed to the second billing address, and the second user would see the second billing address unexpectedly changed to the first billing address. Also, each of the other applications would have only the second billing address. In general, when multiple applications change the same data nearly simultaneously, a conflict may arise.

To resolve conflicts, the synchronization system checks the version number of entities to which a transaction applies. Each entity, in addition to having a globally unique identifier, has a version number that is updated each time the entity is updated. For example, the version number can be the time of the update or a counter that is incremented each time the entity is updated. The synchronization system stores for each entity that it has synchronized the version number associated with the last synchronization. Continuing with the customer billing address example, the customer entity with the old billing address may have a version number of 1. When the first user updates the billing address, the version number is changed from 1 to 2 and included in the transaction that is sent to the synchronization system. When the synchronization system receives the first transaction, it checks the synchronization store and sees that the last version of that customer entity that was synchronized was version number 1. Since the first transaction is modifying the synchronized version of the customer entity, the synchronization system allows the first transaction to be synchronized with the other applications. When the second user updates the billing address, the version number is also changed from 1 to 2. When the synchronization system receives the second transaction, it checks the synchronization store and sees that the last version of the customer entity that was synchronized was version number 2. Since the second transaction is attempting to update an outdated version of the customer entity, the synchronization system identifies that a conflict has occurred.

The synchronization system may resolve the conflict by allowing a master for each entity to be designated. Continuing with the example, the master for a customer entity may be designated as the first application. In such a case, when the synchronization system receives the second transaction, it will note that the source application is not the master of the customer entity and disregard the second transaction or replace the action (e.g., update) of the transaction with a no operation (i.e., no-op) action. If, however, the second application is the master of the customer entity, then the synchronization system allows the second transaction to overwrite the first transaction. When the second application receives the first transaction, it will disregard that first transaction since the second application is the master of that customer entity.

In some embodiments, the synchronization system defines compound transactions for compound entities that contain one or more simple transactions for simple entities. Each compound transaction identifies a compound entity that is to be the subject of a transaction, and each simply transaction identifies a simple entity. For example, a compound transaction may identify a customer order as its compound entity, and the simple transactions may identify order items, customer, and delivery address as simple entities. A compound transaction may modify any of its simple entities. For example, a compound transaction that updates a customer order may include simple transaction to delete an existing order item, add a new order item, change the delivery address, and so on. The synchronization system may synchronize the sending of transactions at the compound transaction level, but resolve conflicts at the simple transaction level. For example, when the synchronization system receives a compound transaction for a customer order, it checks to ensure all earlier-received compound transactions for that customer order have completed before sending the newer-received compound transaction to the other applications. If the synchronization system detects that a simple transaction of the compound transaction for the customer order is attempting to update an old version of an order item, it resolves the conflict for that simple transaction.

In some embodiments, the synchronization system may allow applications various options for providing their transactions to the synchronization system. The synchronization system may support a push model in which an application asynchronously sends its transactions to a queue of the synchronization system. Periodically, the synchronization system retrieves the transactions from the queue and adds those transactions to the synchronization store. The synchronization system may also support a pull model in which the synchronization store polls an application for its transactions and stores the transactions directly in the synchronization store. Each application may interface with a synchronization service proxy that receives transactions from the application and provides those transactions to the synchronization store using either the push model or the pull model. Although an application needs to be modified to provide its transactions to the synchronization service proxy, such modification need only be performed once and does not need to be duplicated for each application to which that application is synchronized.

In some embodiments, the synchronization system supports compound transactions for actions that include update, delete, create, unlink, and refresh. An update compound transaction specifies to change the data of the compound entity as indicated by the simple transactions. A delete compound transaction indicates to delete the compound entity. A create compound transaction indicates to create a compound entity as indicated. An unlink compound transaction indicates that the synchronization system should no longer synchronize the data of that compound entity. The synchronization system removes unlinked entities from the synchronization store so that, if a transaction relating to that entity is received, it can disregard that transaction. A refresh compound transaction specifies that the data of the compound entity is to be set as indicated by the transaction and any pending transactions are to be discarded. Refresh compound transactions can be used initially to ensure that the data for the different applications are initially consistent. In addition, a refresh transaction can be used to resynchronize data that may have become unsynchronized. A refresh compound transaction, however, will not result in creation of an entity that is currently not maintained by an application. Each simple transaction also has an associated action such as create, delete, and update. In general, delete and create transactions are always allowed.

In some embodiments, the synchronization system will allow dependencies of compound transactions to be specified. If a compound transaction is dependent on another compound transaction, the synchronization system ensures that depended-upon compound transaction completes before the dependent compound transaction. Each compound transaction may include a dependency list that list the identifiers of the compound transactions on which it depends. For example, a compound transaction to create a customer order entity may specify that it is dependent on a compound transaction to create the corresponding customer entity. When the synchronization system receives a transaction for an entity whose dependency has not yet been satisfied, the synchronization system holds that transaction in the synchronization store until its dependency is satisfied.

In some embodiments, the synchronization system allows entities to optionally be synchronized using a one-way model or a two-way model. With a one-way model, the synchronization system promulgates changes made to an entity by its master application to the other applications. However, the synchronization system does not promulgate to the other applications changes made to an entity by applications other than the master application. Since only transactions of the master application are promulgated with the one-way model, conflicts do not arise. With the two-way model, the synchronization system allows any of the applications to update an entity. Each entity (e.g., a specific customer) or each class of entities (e.g., customers) can be designated as adhering to the one-way model or the two-way model. Similarly, master applications can be designated on a per-entity basis or a per-class-of-entities basis.

FIG. 1 is a block diagram that illustrates the overall architecture of the synchronization system in some embodiments. The synchronization system 130 may include a receive transactions subsystem 110 and a send transactions subsystem 120. The receive transactions subsystem may include a pull and store transactions component 111, an add transactions to synchronization store component 112, an add queued transactions to synchronization store component 113, a synchronization queue 114, and a synchronization store 115. The transactions received from applications using the push model are added to the synchronization queue 114. The pull and store transactions component implements the pull model by requesting applications to provide their recent transactions and adding those transactions to the synchronization store. The add transactions to synchronization store component is invoked to add transactions to the synchronization store. The add queued transactions to synchronization store component is invoked to remove transactions from the synchronization queue and ad them to the synchronization store.

The send transactions subsystem includes entity adapters 121 and 122, a process transaction confirmation component 123, a process update confirmation component 124, a synchronize component 125, a check if ready to synchronize component 126, a synchronize transactions component 127, and a check for and resolve conflict component 128. The entity adapters each provide a common interface for the synchronization system to send transactions to a specific application. The synchronize component scans the synchronization store and sends transactions of the synchronization store as appropriate. The synchronize component invokes the check if ready to synchronize component to determine the transaction is ready to be sent. The synchronize component invokes the synchronize transaction component to resolve conflicts for the simple transactions of the compound transaction that is being synchronized. The check for and resolve conflict component identifies and resolves a conflict for a simple transaction. When a sent transaction has been confirmed as being completed, the process transaction confirmation component is invoked to update the synchronization store to indicate completion of the compound transaction and to notify the source application as appropriate.

The synchronization system is connected to various application systems 140 and 150 via a communications link 160. The application system 140 may include an application 141 and a database 142. The database contains the data of the entities that are to be synchronized. The application system 140 also includes a synchronization service proxy 143 and an adapter interface 144. The adapter interface may interact with the entity adapter of the synchronization system to perform the synchronization transactions. The synchronization service proxy 143 interfaces with the receive transactions subsystem to provide the transactions. The application system 150 includes an application 151, a database 152, a synchronization service proxy 153, and an adapter interface 154 that operate in a similar manner to that of the application system 140.

Although the synchronization system is illustrated as connected to two applications, it can be used to synchronize the data of any number of applications. When multiple target applications are being synchronized, the synchronization system may consider a compound transaction to be complete when all the target applications have confirmed completion. Alternatively, the synchronization system may track completions on a per-application basis so that different transactions to the same entity can be sent to different applications. In addition, components of the synchronization system may be implemented with or integrated with one of the application systems. In such a case, the synchronization system may be optimized to operate with that application.

Figure 2:
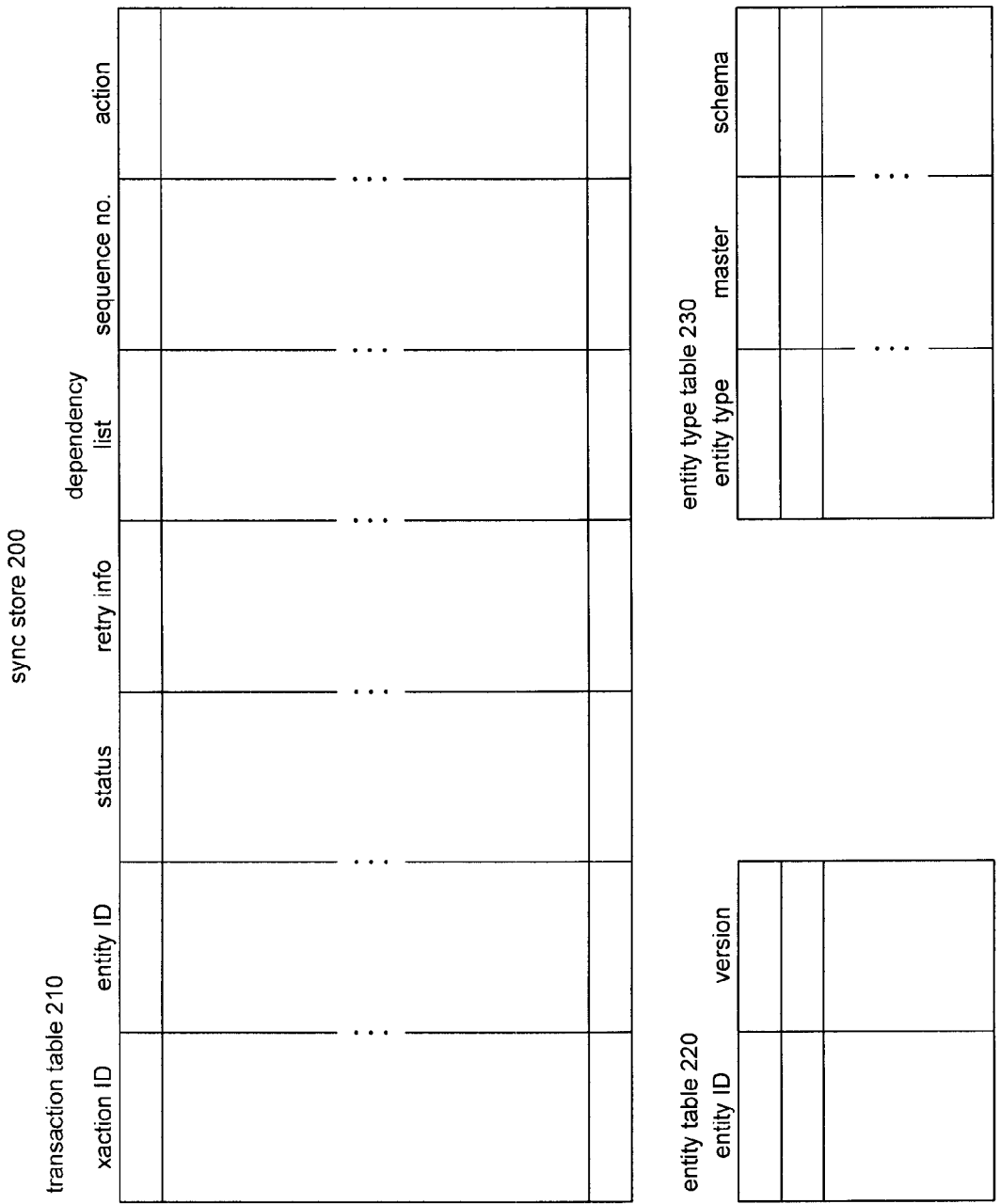
FIG. 2 is a block diagram that illustrates the logical organization of the synchronization store of the synchronization system in some embodiments.

FIG. 2 is a block diagram that illustrates the logical organization of the synchronization store of the synchronization system in some embodiments. The synchronization store may also include other data structures including a table that contains an entry for each entity or each class of entities to indicate the master application for that entity and whether the synchronization type is the one-way model or the two-way model. The synchronization store may also include a table that identifies the network address of the various applications, the entity adapters for each application, and whether the transactions are provided using a push or a pull model. The synchronization store 200 may include a transaction table 210, an entity table 220, and an entity type table 230. The transaction table contains an entry for each compound transaction that has been received by the synchronization system. Each entry contains a unique identifier of the transaction field, a unique identifier of the entity field, a current status of the transaction field, a retry information, a dependency list field, a sequence number field, and an action field. The possible statuses of a compound transaction may be waiting, executing, completed, failed, and canceled. When a transaction is initially added to the transaction table, its status is set to waiting. When a waiting transaction is selected to be sent, its status is set to executing. When the completion of the sent transaction has been confirmed, its status is set to completed. If the execution of a transaction is not successful, its status is set to failed. If a transaction is overridden by a later refresh transaction, its status is set to canceled. The retry information field indicates how many times a failed a transaction has been retried. The synchronization system may allow the administrator to define a retry limit and a retry interval. The synchronization system may provide a user interface so that an administrator can view the status of the transactions and allow the administrator to authorize a refresh transaction for an entity to ensure that all copies of the data for that entity are consistent and set the status of any pending transactions (e.g., a failed transaction) to canceled. The dependency list field contains the transaction identifiers upon which the transaction is dependent. The sequence number field (e.g., time stamp) indicates the ordering of compound transactions for the entity represented by the entity identifier. The action field identifies the action of the compound transaction. An entry of the transaction table may also contain a reference to the corresponding compound transaction that is stored within the synchronization store. The entity table 220 contains an entry for each compound and simple entity that has been encountered by the synchronization system. Each entry contains an entity identifier field and a version field. The entity identifier field identifies an entity, and the version field identifies the version for that entity. In some embodiments, the entity table may contain information describing the relationship between a compound entity and its simple entities so that when a compound entity is deleted or unlinked, the entries for its simple entities can be identified and deleted. The entity type table 230 contains an entry for each compound entity type or class that has been defined for use a by the synchronization system. Each entry contains an entity type field, a master field, and a schema field. The entity type field identifies the entity type of an entry. The master field identifies which application is the master for resolving conflicts. The schema field contains the schema that defines a format of a compound entity. The compound transactions may be XML documents, and the schema may be an XML Schema Definition ("XSD") file. The synchronization system uses the schemas to parse the contents of the compound transactions.

The computing device on which the synchronization system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the synchronization system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the synchronization system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The synchronization system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
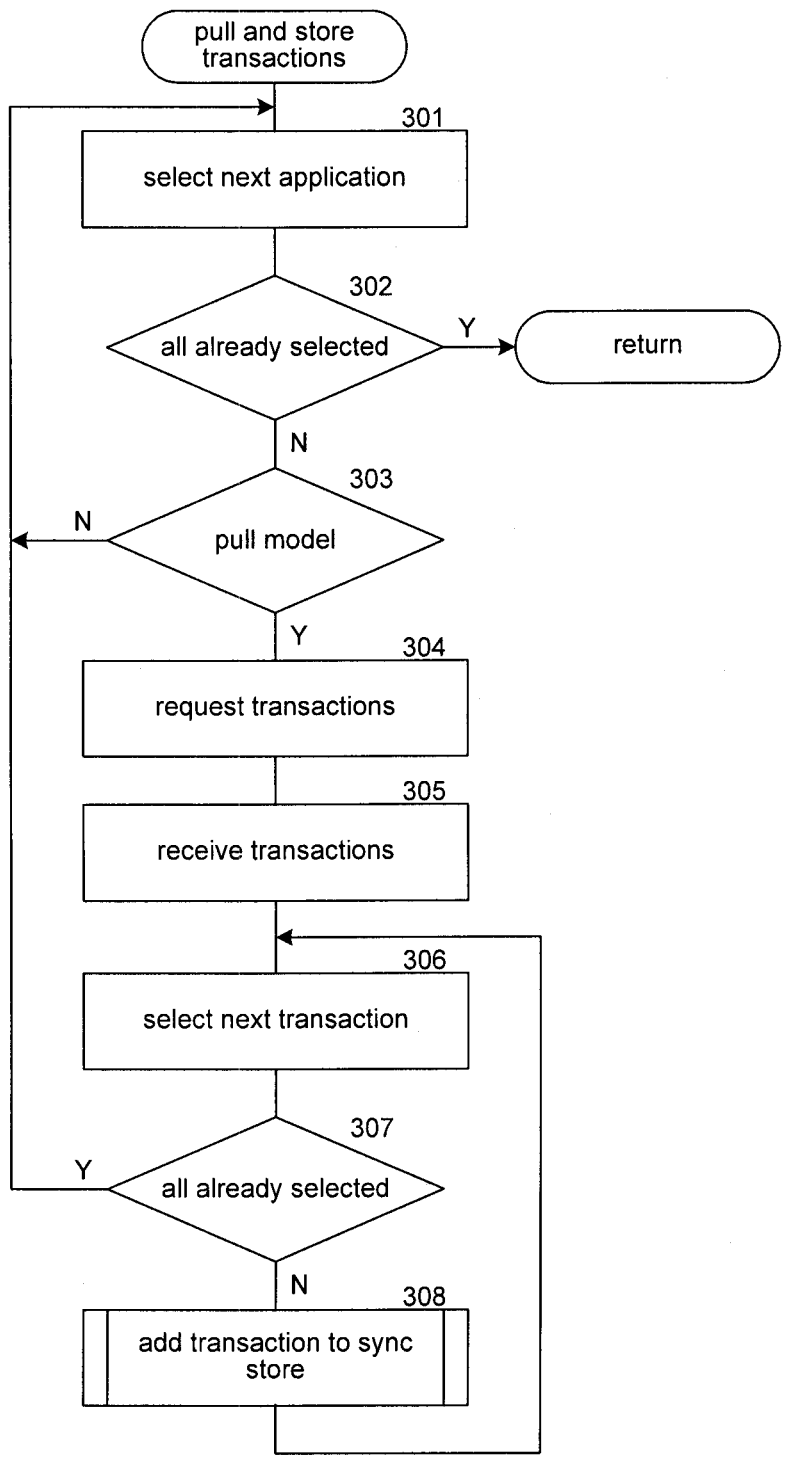
FIG. 3 is a flow diagram that illustrates the processing of the pull and store transactions component of the receive transactions subsystem of the synchronization system in some embodiments.

FIG. 3 is a flow diagram that illustrates the processing of the pull and store transactions component of the receive transactions subsystem of the synchronization system in some embodiments. The component loops retrieving compound transactions from various applications and then adding the received transactions to the synchronization store. In block 301, the component selects the next application. In decision block 302, if all the applications have already been selected, then the component returns, else the component continues at block 303. In decision block 303, if the application uses the pull model to provide transactions, then the component continues at block 304, else the component loops to block 301 to select the next application. In block 304, the component requests the transactions from the application via the synchronization service proxy of the application. In block 305, the component receives the requested transactions, if any. In blocks 306-08, the component loops adding each transaction to the synchronization store. In block 306, the component selects the next received transaction. In decision block 307, if all the received transactions have already been selected, then the component loops to block 301 to select the next application, else the component continues at block 308. In block 308, the component invokes the add transaction to synchronization store component and then loops to block 306 to select the next transaction for the selected application.

Figure 4:
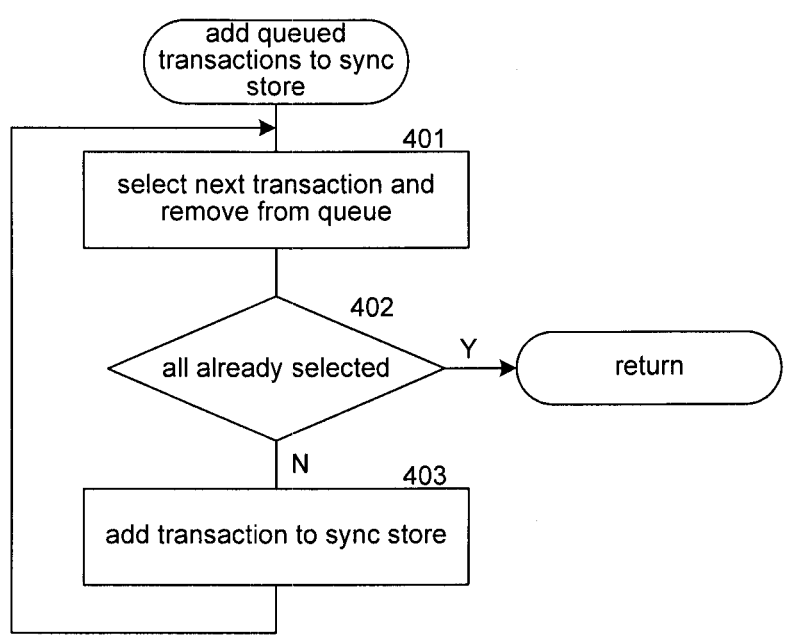
FIG. 4 is a flow diagram that illustrates the processing of the add queued transactions to synchronization store component of the receive transactions subsystem of the synchronization system in some embodiments.

FIG. 4 is a flow diagram that illustrates the processing of the add queued transactions to synchronization store component of the receive transactions subsystem of the synchronization system in some embodiments. The component is invoked periodically to retrieve the transactions from the synchronization queue and adds the transactions to the synchronization store. In block 401, the component selects the next transaction of the synchronization queue. In decision block 402, if all such transactions have already been selected, then the component returns, else the component continues at block 403. In block 403, the component invokes the add transaction to synchronization store component and then loops to block 401 to select the next transaction.

Figure 5:
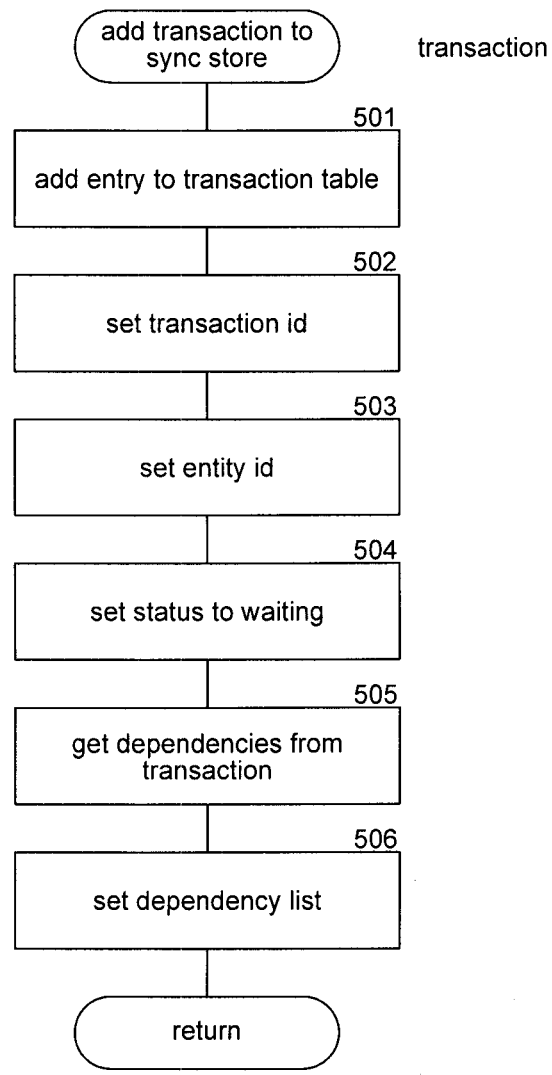
FIG. 5 is a flow diagram that illustrates the processing of the add transaction to synchronization store component of the synchronization system in some embodiments.

FIG. 5 is a flow diagram that illustrates the processing of the add transaction to synchronization store component of the synchronization system in some embodiments. The component is passed a compound transaction and updates the synchronization store accordingly. In block 501, the component adds an entry to the transaction table for the passed transaction. In block 502, the component sets the transaction identification field of the entry. In block 503, the component sets the entity identifier field of the entry. In block 504, the component sets the status field of the entry to waiting. In block 505, the component retrieves the dependencies from the passed transaction. The dependencies may be identified in a compound transaction by an appropriate XML tag. In block 506, the component stores the identifiers of the depended-upon compound transactions in the dependency list field of the entry. The component then returns.

Figure 6:
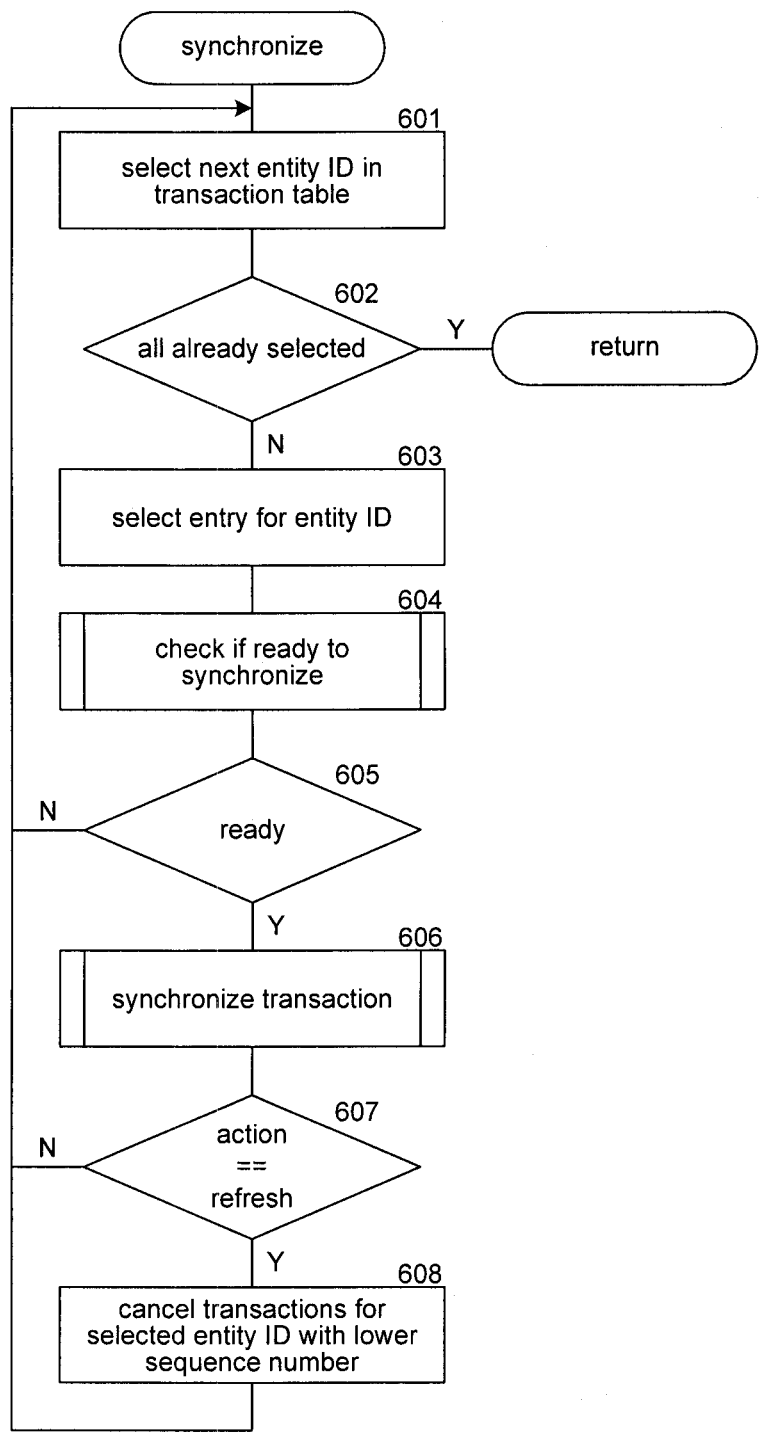
FIG. 6 is a flow diagram that illustrates the processing of the synchronize component of the synchronization system in some embodiments.

FIG. 6 is a flow diagram that illustrates the processing of the synchronize component of the synchronization system in some embodiments. The component may be invoked periodically to determine which compound transactions to send for synchronization. In block 601, the component selects the next entity that is represented in the transaction table. The synchronization store may include an index that the maps entity identifiers to the corresponding entries in the transaction table. In decision block 602, if all the entities have already been selected, then the component returns, else the component continues at block 603. In block 603, the component selects the entry for a compound transaction with a refresh action for the selected entity with the lowest sequence number. If there is no compound transaction with a refresh action for the selected entity, then the component selects an entry for the compound transaction for the selected entity with the lowest sequence number with a status other than canceled or completed. Thus, all compound transactions with refresh actions are selected first followed by the next (in sequence number order) compound transaction with a status of waiting, executing, or failed. In block 604, the component invokes the check if ready to synchronize component to determine whether the selected transaction is ready for synchronization. In decision block 605, if the selected transaction is ready for synchronization, then the component continues at block 606, else the component loops to block 601 to select the next entity. In block 606, the component invokes the synchronize transaction component to perform the synchronization for the selected transaction. In decision block 607, if the action of the selected transaction is a refresh, then the component continues at block 608, else the component loops to block 601 to select the next entity. In block 608, the component sets the status of transactions for the selected entity with lower sequence numbers to canceled. The component then loops to block 601 to select next entity.

Figure 7:
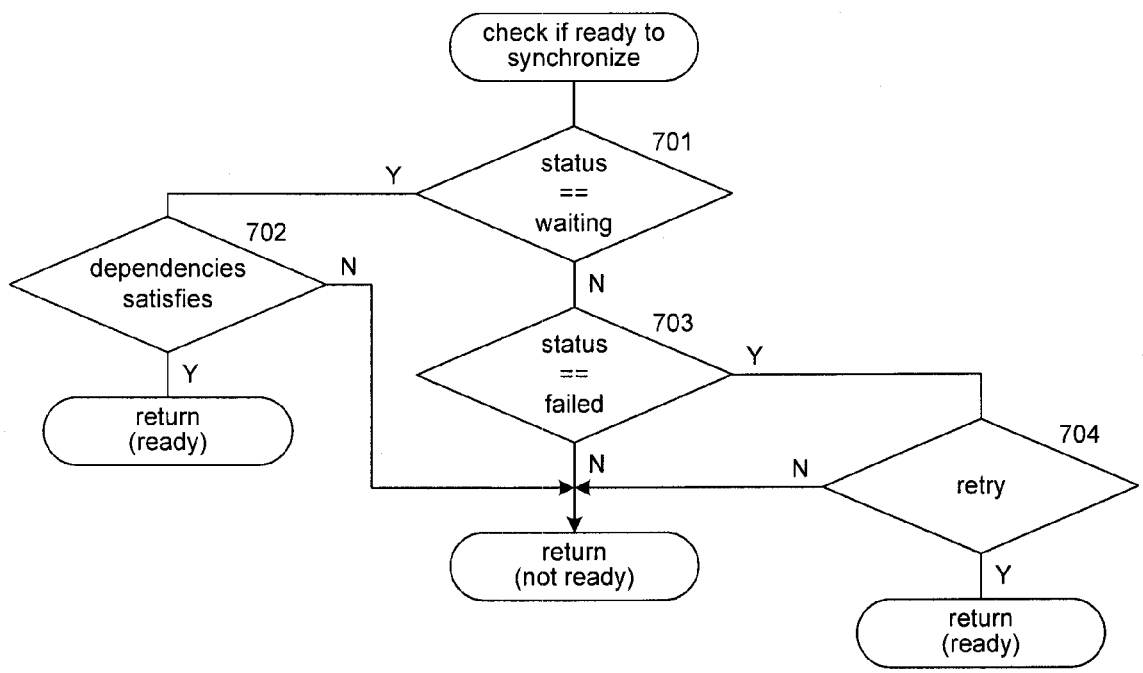
FIG. 7 is a flow diagram that illustrates the processing of the check if ready to synchronize component of the synchronization system in some embodiments.

FIG. 7 is a flow diagram that illustrates the processing of the check if ready to synchronize component of the synchronization system in some embodiments. The component is passed an indication of a compound transaction with a status of executing, waiting, or failed and determines whether it is ready for synchronization. A transaction is ready for synchronization if its status is set to waiting, there is no executing transaction for the same entity, and all its dependencies have been satisfied or if its status is failed and it is time to retry. In decision block 701, if the status of the passed a transaction is waiting, then the component continues at block 702, else the component continues at block 703. In decision block 702, if the dependencies of the passed transaction are satisfied, then the component returns an indication of ready, else the component returns an indication of not ready. In decision block 703, if the status of the passed transaction is failed, then the component continues at block 704, else the status is executing and the component returns an indication of not ready because the synchronization is in process. In decision block 704, if it is time to retry the failed transaction, then the component returns an indication of ready, else the component returns an indication of not ready.

Figure 8:
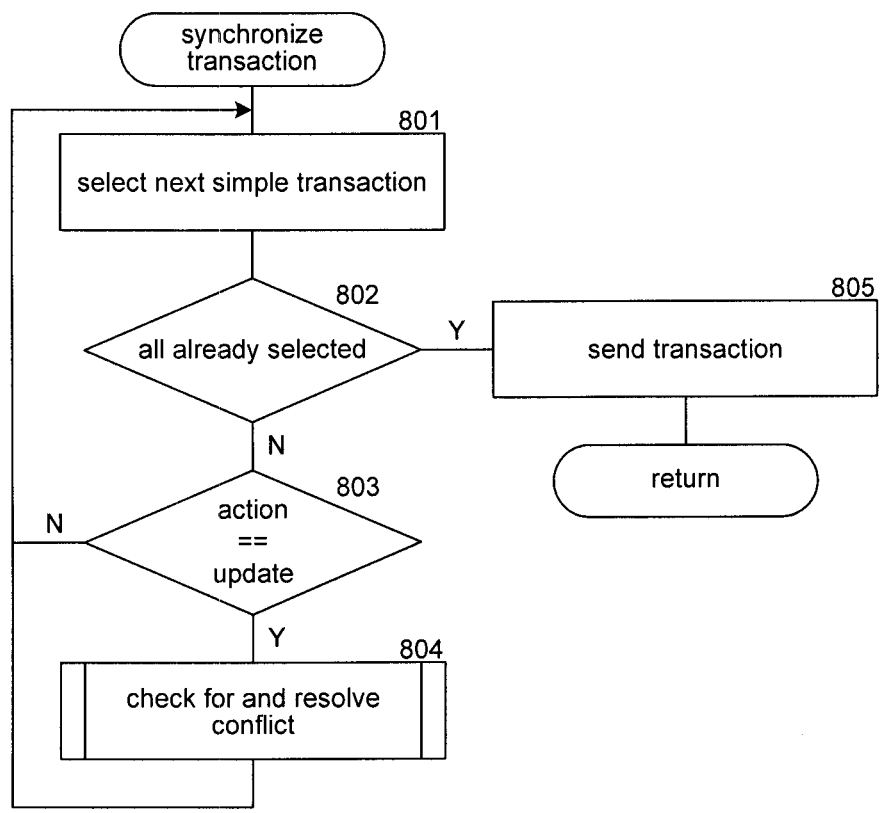
FIG. 8 is a flow diagram that illustrates the processing of the synchronize transaction component of the synchronization system in some embodiments.

FIG. 8 is a flow diagram that illustrates the processing of the synchronize transaction component of the synchronization system in some embodiments. The component is passed a compound transaction, checks for conflicts for the simple transactions within the compound transaction, and then sends the compound transaction for synchronization. In blocks 801-804, the component loops processing the simple transactions within the compound transaction. In block 801, the component selects the next simple transaction. In decision block 802, if all the simple transactions have already been selected, then the component continues at block 805, else the component continues at block 803. In decision block 803, if the action of the selected simple transaction is an update, then the component continues at block 804, else the component loops to block 801 to select the next simple transaction. In block 804, the component invokes the check for and resolve conflict component to resolve any conflicts for the selected simple transaction and the component loops to block 801 to select the next simple transaction. In block 805, the component sends the compound transaction after resolving any conflicts with its simple transactions and then returns.

Figure 9:
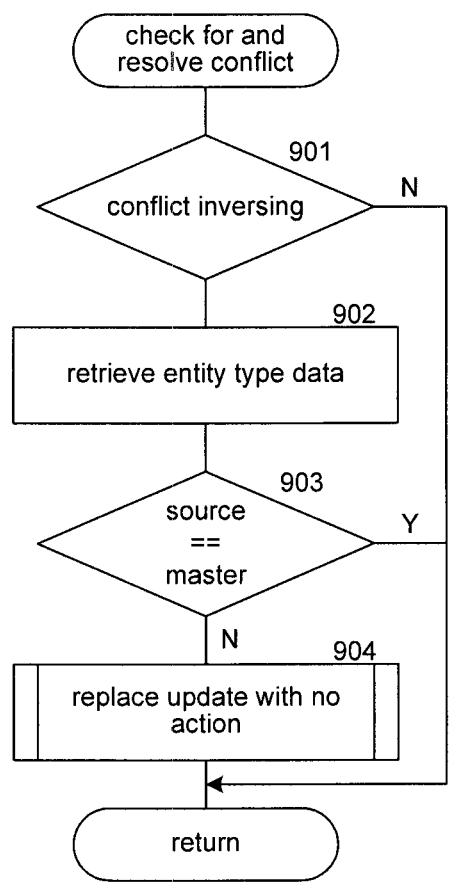
FIG. 9 is a flow diagram that illustrates the processing of the check for and resolve conflicts component of the synchronization system in some embodiments.

FIG. 9 is a flow diagram that illustrates the processing of the check for and resolve conflicts component of the synchronization system in some embodiments. In decision block 901, if there is a conflict in the version of the simple entity identified in the transaction and the version in the entity table, then the component continues at block 902, else the component returns. In block 902, the component retrieves an entry for the entity type of the entity from the entity type table. In decision block 904, if the source for the entity type is the master, then the component returns, else the component replaces the update action in the simple transaction with an indication of no action and returns.

Figure 10:
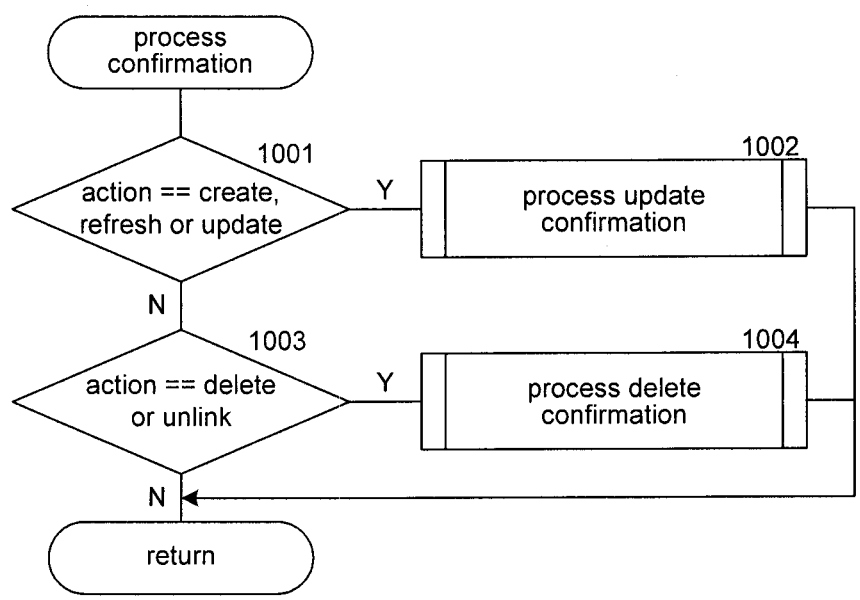
FIG. 10 is a flow diagram that illustrates the processing of the process confirmation component of the synchronization system in some embodiments.

FIG. 10 is a flow diagram that illustrates the processing of the process confirmation component of the synchronization system in some embodiments. The component is invoked to process a confirmation of a sent transaction is received from a target application. In decision block 1001, if the action of the compound transaction that is being confirmed is create, refresh, or update, then the component continues at block 1002, else the component continues at block 1003. In block 1002, the component invokes the process update confirmation component and then returns. In decision block 1003, if the action of the confirmed compound transaction is delete or unlink, then the component continues at block 1004, else the component returns. In block 1004, the component processes the delete confirmation by removing the entries corresponding to the entities of the transaction from the entity table and then returns.

Figure 11:
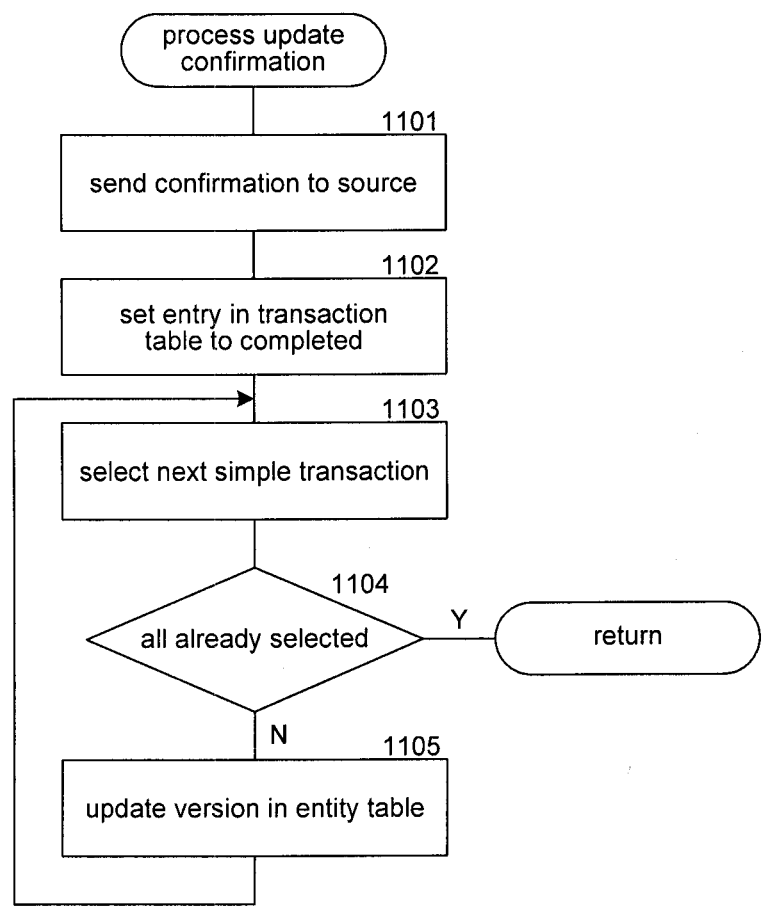
FIG. 11 is a flow diagram that illustrates the processing of the process update confirmation component of the synchronization system in some embodiments.

FIG. 11 is a flow diagram that illustrates the processing of the process update confirmation component of the synchronization system in some embodiments. The component sends a confirmation to the source and then updates the synchronization store as appropriate. The confirmation is sent to the source because the target application adds its unique identifier for the entity that has been created to the confirmation. The transaction received from the source application included the unique identifier used by the source application to identify the entity being added. In this way, both the source application and the target application have a mapping from between identifiers for the created entity. In block 1101, the component sends the confirmation to the source application. In block 1102, the component sets the entries in the transaction table for the transaction being confirmed to complete. In blocks 1103-1105, the component loops updating the versions in the transaction table. In block 1103, the component selects the next simple transaction. In decision block 1104, if all the transactions have already been selected, then the component returns, else the component continues at block 1105. In block 1105, the component updates the version of the selected simple transaction in the entity table and then loops to block 1103 to select the next simple transaction. The component may also update the version number for the compound transaction that is being confirmed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a synchronization system for synchronizing entities of multiple applications, each application having a separate copy of the data of the entities, the method comprising:

for each application, providing an entity adapter that provides a common interface for accessing data of the entities of that application;

providing a synchronization store that, for each entity that has been synchronized, tracks a version of the entity that was last synchronized;

receiving from a source application an indication of a transaction performed by the source application for updating a version of an entity, the received transaction identifying the entity, the version of the entity, and an action to apply to the entity;

storing an indication of the received transaction;

waiting until any sent synchronization transaction for the entity completes and until dependencies of the received transaction have been satisfied;

determining whether the version of the entity in the received transaction is the same as the version of the entity that was last synchronized;

when the determining indicates that the version of the entity in the received transaction is the same as the version of the entity that was last synchronized, sending a transaction corresponding to the received transaction to an entity adapter of a target application for updating the entity of the target application in accordance with the received transaction; and when the determining indicates that the version of the entity in the received transaction is not the same as the version of the entity that was last synchronized, determining whether the source application or the target application has been designated as master of the entity;

when it is determined that the source application is not master, disabling the received transaction; and when it is determined that the source application is master, sending a transaction corresponding to the received transaction to the entity adapter of the target application for updating the entity of the target application in accordance with the received transaction.

2. The method of claim 1 wherein transactions are sent asynchronously by a source application to the synchronization system via a synchronization service proxy of the source application.

3. The method of claim 1 wherein the synchronization system contacts each application to initiate retrieval of transactions via a synchronization service proxy of the application.

4. The method of claim 1 wherein an entity is a compound entity that includes simple entities.

5. The method of claim 1 wherein a transaction is a compound transaction comprising simple transactions.

6. The method of claim 1 wherein a transaction includes an action performed on the entity by the source application, the action being selected from the group consisting of update, delete, and create.

7. The method of claim 6 wherein delete and create actions are always allowed.

8. The method of claim 6 wherein the group further consists of unlink and refresh.

9. The method of claim 8 wherein when a refresh transaction is received for an entity, any transactions currently pending for that entity are discarded.

10. The method of claim 1 wherein each application provides an adapter interface for servicing requests from the entity adapter for that application.

11. A computer-readable storage device for controlling a computing device implementing a synchronization system to synchronize data of entities maintained by applications, by a method comprising:

for each application, providing an entity adapter that provides a common interface for accessing entities of that application via an adapter interface of the application;

receiving from a source application an indication of a compound transaction performed by the source application for modifying a version of a compound entity, the compound transaction comprising simple transactions for modifying simple entities of the compound entity;

waiting until any previously sent transaction for the compound entity completes;

when a conflict exists between versions of a simple entity of the compound entity maintained by the source application and a target application and the conflict is to be resolved in favor of the target application, disabling an action associated with the simple transaction for the simple entity; and sending a transaction corresponding to the received transaction with the action of a simple entity of the transaction disabled to the entity adapter of the target application for applying the compound transaction to the compound entity of the target application via the adapter interface of the target application.

12. The computer-readable storage device of claim 11 wherein transactions are optionally sent asynchronously by a source application to the synchronization system via a synchronization service proxy of the source application or sent in response to a request received from the synchronization system via the synchronization service proxy.

13. The computer-readable storage device of claim 11 wherein the compound transaction includes identifiers of depended-upon compound transaction wherein the waiting is further until the identified depended-upon transaction completes.

14. The computer-readable storage device of claim 11 wherein a transaction includes an action being selected from the group consisting of update, delete, create, unlink, and refresh.

15. The computer-readable storage device of claim 11 wherein the synchronization system maintains an indication for an entity of the last synchronized version of the entity.

16. The computer-readable storage device of claim 15 wherein a conflict arises when a version of an entity being updated is later than the last synchronized version of the entity.

17. The computer-readable storage device of claim 16 wherein pending transactions to update an entity are sent as transactions in order of the versions of the entity being updated.

18. A computing device implementing a synchronization system to synchronize data of entities maintained by applications, comprising:

a memory storing computer-executable instructions of:
for each application, an entity adapter that provides a common interface for accessing entities of that application via an adapter interface of the application;
a component that receives from a source application a transaction for a first entity;
a component that, after receiving the transaction for the first entity, waits for all previously sent transactions for the first entity that were sent to the entity adapter of a target application to complete;
a component that, when all previously sent transactions for the first entity that were sent to the entity adapter of the target application have been completed, sends a transaction corresponding to the received transaction to the entity adapter of the target application for forwarding to the adapter interface of the target application; and
a component that, when a conflict exists between the data of the first entity maintained by the source application and the target application, disables effect of an action of the received transaction when the conflict is to be resolved in favor of the target application; and
a processor that executes the computer-executable instructions stored in the memory.

19. The computing device of claim 18 wherein the component that receives transactions optionally receives the transactions as sent asynchronously by a source application to the synchronization system via a synchronization service proxy of the source application or receives the transactions as sent in response to a request received at the source application from the synchronization system via the synchronization service proxy.

20. The computing device of claim 18 wherein a transaction is a compound transaction for a compound entity, the compound transaction have simple transactions for simple entities of the compound entity.

* * * * *